United States Patent [19]

Hamm et al.

[11] 4,445,162

[45] Apr. 24, 1984

[54] COMPACT CHASSIS PLATE FOR SWITCHGEAR ENCLOSURE

[75] Inventors: Sidney R. Hamm, Brandon, Miss.; Thomas E. Young, Irmo, S.C.

[73] Assignee: Siemens-Allis, Inc., Atlanta, Ga.

[21] Appl. No.: 298,774

[22] Filed: Sep. 2, 1981

[51] Int. Cl.³ .............................................. H02B 1/04
[52] U.S. Cl. ................................... 361/334; 200/337; 200/50 C; 200/153 SC; 361/356
[58] Field of Search .............. 361/334, 335, 356, 357, 361/376, 420, 363; 200/153 SC, 48 R, 153 H, 318, 337, 50 R, 145, 148 F, 50 C

[56] References Cited

U.S. PATENT DOCUMENTS

| | | | |
|---|---|---|---|
| 496,739 | 5/1893 | Kennedy | 248/407 X |
| 2,179,329 | 11/1939 | Gates | 200/50 C |
| 3,894,204 | 7/1975 | May et al. | 200/153 SC X |
| 3,958,156 | 5/1976 | Tjebben | 200/153 SC X |

FOREIGN PATENT DOCUMENTS 346925  7/1960  Switzerland ................... 200/148 F Primary Examiner—J. V. Truhe
Assistant Examiner—Gregory D. Thompson
Attorney, Agent, or Firm—John L. James

[57] ABSTRACT

An improved housing structure for a circuit interrupter. The interrupter mechanisms are mounted upon the upper surface of a platform which serves to divide the housing into upper and lower, high- and low-voltage compartments. The platform is provided with a series of vertically-depending bracing plates which carry a cross shaft for operating the interrupters. An operator mechanism is coupled to the cross shaft and hangs downwardly from the platform so that forces generated in opening and closing the interrupters are not transmitted to the housing structure but rather are contained within the platform assembly.

9 Claims, 3 Drawing Figures

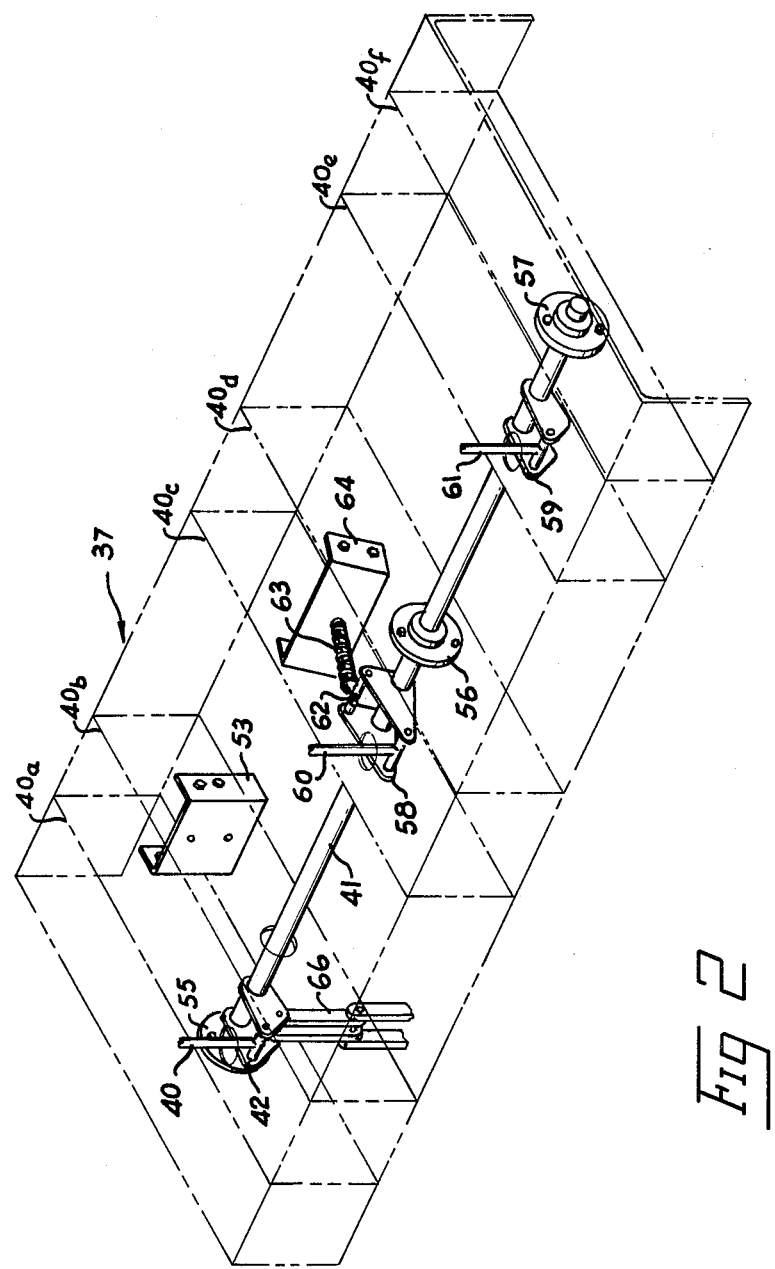

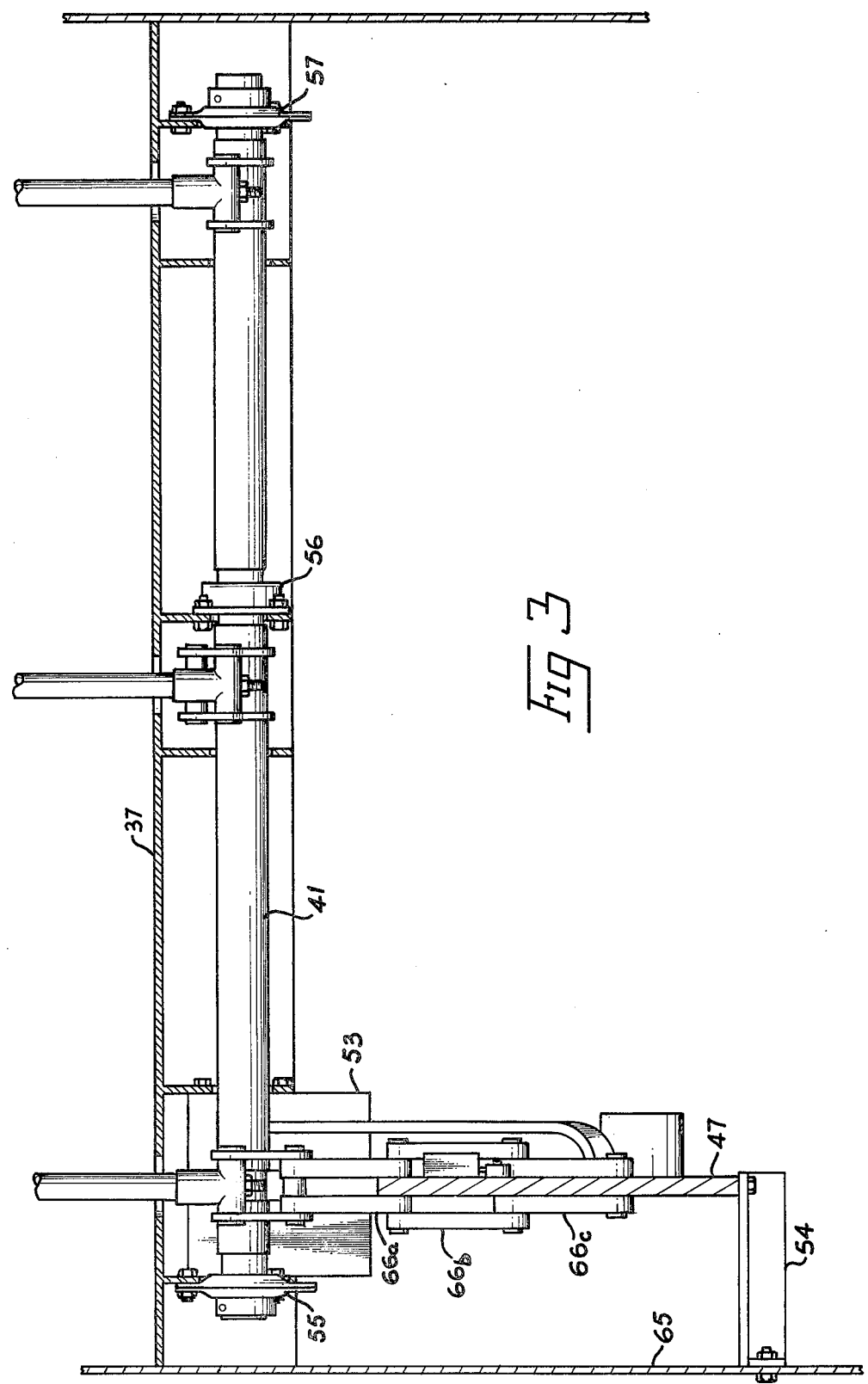

COMPACT CHASSIS PLATE FOR SWITCHGEAR ENCLOSURE

BACKGROUND OF THE INVENTION

The present invention relates to circuit interrupters and housings therefor, and more particularly to an improved housing structure.

Circuit interrupters, particularly those rated at higher voltage and current levels, are frequently enclosed in metal cabinets or housings which may be disposed either within a building or out-of-doors. Frequently such housings are fabricated of sheet metal pieces, which are bolted together to form the desired structure. Ordinarily such structures are reinforced with angle or channel bracing. At least a portion of the structure is conventionally reinforced to withstand the stresses and reaction forces of the operating mechanisms which open and close the circuit interrupters.

As is well known by those skilled in the art, the circuit interrupters for industrial circuit breakers are large and relatively massive. In order to cause them to open and/or close with the necessary speed, large and powerful operator mechanisms are required. Frequently such mechanisms take the form of spring-loaded mechanical movements, often provided with electric motors and gear trains or rachet units for charging opening and closing springs. Electric signals are utilized to operate tripping mechanisms such as switches and solenoids which release the energy stored in the springs to open or close the interrupter mechanisms.

Owing to the size and weight of the interrupters and associated apparatus, and to the large forces required to move them rapidly, the structures which carry the operating mechanisms and the circuit interrupters must be extremely strong and must resist movement during operation of the system. For this reason, it has been conventional to construct such units by building a substantial subframe from angle, channel or similar structural material and to mount the various operating mechanisms, linkages, etc. to the rigid subframe. Sheet metal panels, or partly-assembled sheet metal cabinets, are then attached to enclose the structural framework. Supporting members or legs are frequently fabricated separately and then bolted or welded to the heavy subframe. To complicate matters further, it is ordinarily necessary to operate three circuit interrupters in synchronism. This is frequently accomplished with a common linkage or shaft which extends within the housing. The linkage must be rigidly supported to maintain alignment and to prevent deflection when the mechanism operator is actuated.

While such structures have the advantage of being relatively simple to design and fabricate, they are relatively heavy and require the use of costly structural material. Accordingly, it will be appreciated that it would be highly desirable to provide an enclosure for a circuit interrupting mechanism which is sufficiently rigid but is lighter, and uses less structural material, than those heretofore known.

It is accordingly an object of the present invention to provide an improved circuit interrupter housing.

It is another object of the invention to provide a circuit interrupter housing which localizes stresses and eliminates the need for heavy structural subframes.

Another object of the invention is to provide a circuit interrupter housing with a lightweight, adjustable leg mounting.

SUMMARY OF THE INVENTION

Briefly stated, in accordance with one aspect of the invention, the forgoing object are achieved by providing a planar platform structure disposed horizontally within the housing. The platform comprises a horizontal plate member with a number of generally parallel, spaced bracing plates depending from it. A group of circuit interrupters are mounted on the upper surface of the platform, with actuating links or rods extending downwardly through the platform where they are linked to a cross shaft journaled through the bracing plates. An operator mechanism is mounted on the underside of the platform, being coupled both to the cross shaft and to another, spaced point on a bracing plate so that forces generated by the operating mechanism are contained within the platform structure. In a preferred embodiment, an opening spring bears on an arm extending from the cross shaft at a location spaced from the operator, between a pair of bracing plates.

BRIEF DESCRIPTION OF THE DRAWINGS

While the specification concludes with claims particularly pointing out and distinctly claiming the subject matter which is regarded as the invention, it is believed that the invention will be better understood from the following description of a preferred embodiment taken in conjuction with the accompanying drawings in which:

FIG. 2 is a phantom diagram of a portion of the housing structure of FIG. 1; and FIG. 3 is a view taken at III—III of FIG. 1.

DESCRIPTION OF A PREFERRED EMBODIMENT

Figure 1:
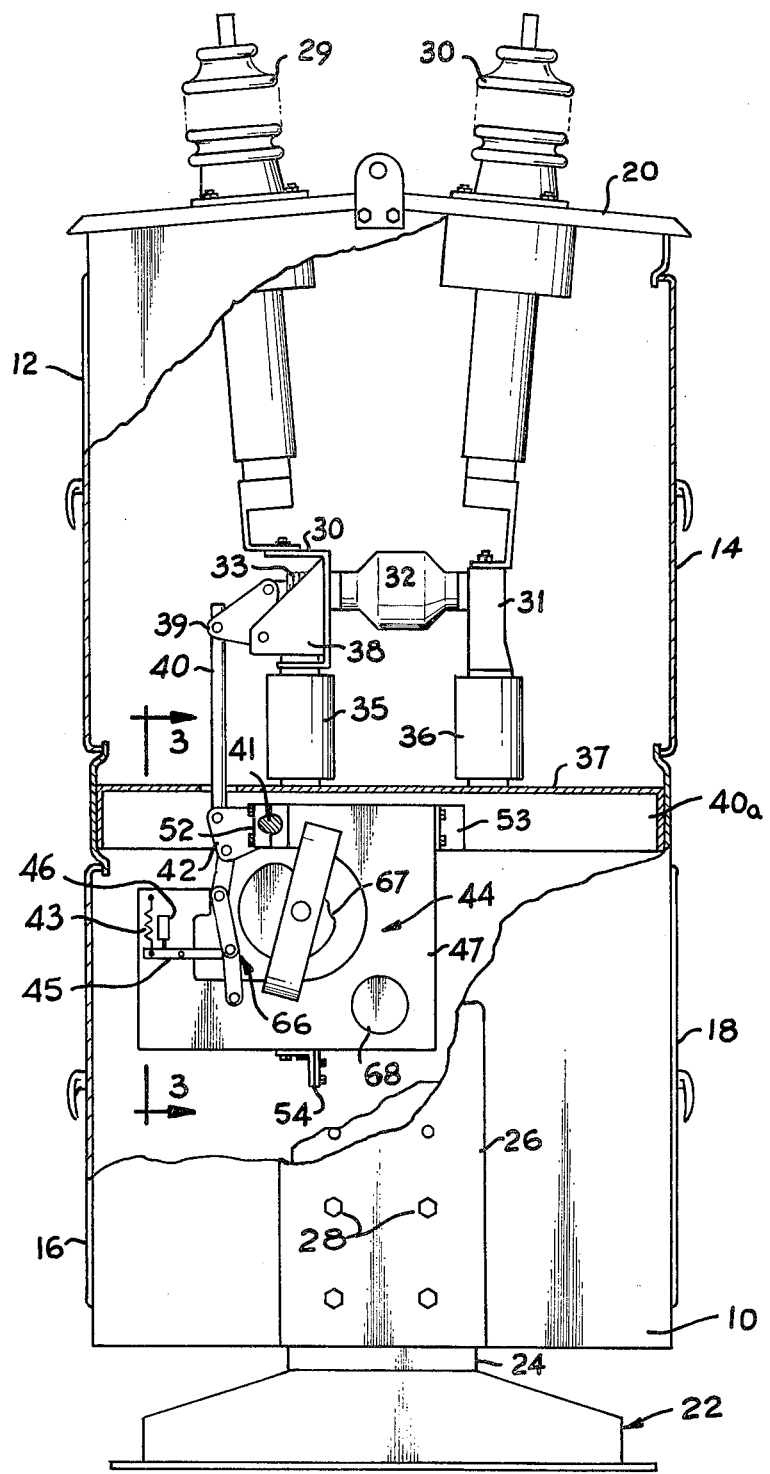
FIG. 1 is a partially cutaway view of a circuit interrupter housing making use of the present invention.

FIG. 1 is a cutaway end view of a circuit interrupter housing of the outdoor type, seen from one end. The housing is provided with an end wall 10 (shown partially cut away) and side surfaces having upper doors 12, 14 and lower doors 16, 18. A roof 20 is slanted to allow rainwater to run off.

The enclosure is supported by a pair of legs, of which only a single leg 22 is visible in the figure. The leg includes a columnar member 24 which is slidingly received within an elongate vertical enclosure 26 attached to each end wall of the housing, preferably by welding. Enclosure 26 is open at its lowermost end to allow member 24 to be slidingly received within it. A plurality of holes are provided, and bolts 28 engage tapped holes in member 24 when the leg is placed at the desired height.

Extending through roof 20 are a series of bushings two of which 29, 30 are visible in the Figure. The bushings serve as lead-ins for conductors which are coupled to metal connectors 30, 31 extending from opposite ends of an interrupter, here shown as a vacuum interrupter 32.

As is known to those skilled in the art, a vacuum interrupter often takes the form of a cylindrical, evacuated envelope of metal or ceramic material within which are disposed a pair of conductive contacts. Movement of the contacts is provided by coupling one of them to the envelope bottle by means of metal bellows 33 or the like. Accordingly, an electrical circuit is made or broken by urging the movable contact against the stationary one, or pulling it away. This activity is controlled by an operator mechanism in concert with a series of levers and/or other mechanical movements. In the illustrated embodiment, interrupter 32 is supported by insulative structures 35, 36 upon a rigid platform, the upper surface of which is formed by a horizontal plate 37. a bracket 38 supports a bellcrank 39 so that the latter can pivot back and forth, causing the movable contact of interrupter 32 to meet and to separate from the stationary contact.

Movement of bellcrank 39 is controlled by a push rod 40. Rod 40, preferably made of an insulative material, extends through an opening in horizontal plate 37 and is pivotally attached to a rotatable cross shaft 41 by means of arm 42. Also, coupled to arm 42 is the linkage of an operator mechanism generally indicated at 44. A trip latch 45 is held in place, and triggered by an electric solenoid 46. The linkage, latches and other working elements of the operator mechanism are carried by a single rigid plate 47.

The operator mechanism, or more specifically the base plate 47 which forms its frame, hangs vertically beneath the platform upon which the interrupter structure is mounted. As is familiar to those skilled in the art a circuit interrupter operator of the type depicted may include a folding linkage 66 and a cam 67 which may be rotated to cause the linkage to extend from a collapsed position and close the interrupter. The linkage is comprised of three toggles 66a, 66b and 66c each of which consists of a pair of toggle members symmetrically aligned in the plane of the frame 47. A pin coupling links 66a and 66b rests on an abutment 66c when the linkage is extended, and the interrupter in the closed position. The pin connecting the lower links 66b and 66c bears against the end of trip latch 45. The latter need not be directly in the plane of frame 47, as the reactive forces which arise by holding the link in the position shown in FIG. 1 are contained within the frame, and do not cause it to move laterally. A closing spring (not shown) is coupled to the cam and can be tripped to drive the cam around, extending the linkage and closing the interrupter. An electric motor 68 is then operated to recharge the closing spring. In order to prevent the forces generated by the operator from being transmitted to the base or side walls of the housing structure, the operator is supported only by the platform. Forces generated by the operator act in the plane of the frame 47, and movement in this plane is arrested at two points. The first point is cross shaft 41 itself, frame 47 being located on the cross shaft by means of a split bearing. The cap 52 of the split bearing is bolted to the frame, forming an opening within which the cross shaft may rotate. At the same time, translational movement of the operator mechanism is prevented.

To prevent the operator mechanism from rotating about shaft 41, a second mounting point is established at a site remote from the shaft. A bracket 53 is secured to vertically-depending bracing plate 40a, and to the edge of frame 47 by means of bolts or the like. Alternatively, the frame may be bolted to an adjacent bracing plate and bracing strut 54 may be omitted. Regardless of the specific manner of securing the operator mechanism, it is only necessary to prevent it from moving in the plane in which its forces are generated and therefore the operator mechanism may be allowed to simply hang from the platform, without the need for additional, cumbersome bracing.

In the depicted embodiment a steadying brace or strut 54 extends from a point at the lowermost edge of the operator frame to one of the end walls of the housing structure to prevent minor, lateral movement in a direction perpendicular to the plane of operator frame 47. In a preferred embodiment strut 54 takes the form of a length of angle material which simply steadies the operator frame against lateral movement due to miscellaneous forces, vibration, etc. Owing to the length of strut 54, and the relative flexibility of the end wall of the housing structure, the reactive forces produced by the movement of the operator and interrupter linkage are absorbed fully by cross shaft 41 and thus by the platform assembly through the shaft and through bracket 53.

Turning now to FIG. 2 the structure of cross shaft 41 is shown in further detail, along with the manner of its mounting upon platform 37. In the preferred embodiment the upper plate of platform 37 has its edges turned downwardly to form a shallow "u", and three pairs of vertically-depending bracing plates 40a–40f are welded to its lower surface. Cross shaft 41 extends through openings in the bracing plates, extending generally perpendicularly to them. One of each of the pairs of plates carries a bearing, herein identified as 55, 56 and 57. Such bearings may be commercially-available pillow blocks or plain or frictionless bearings having flanges which are bolted to plates 40a, 40d and 40f as shown.

The various pairs of plates are generally aligned with the locations of the three interrupters which are supported by the plateform. Arms 42, 58 and 59 are secured to shaft 41 by appropriate means such as pinning, bolting, clamping or welding at locations which correspond with the position of the various interrupters. In a presently preferred embodiment the arms are formed by pairs of metal plates welded to the shaft and have trunions extending between them for pivotally attaching push rods 40, 60 and 61 to the cross shaft.

Arm 42 carries a second trunion which pivotally couples the arm to the operator mechanism by means of linkage 66. The center arm 58 also bears a second trunion through which is threaded a push rod 62 extending through a coil spring 63. The opposite end of the coil spring rests against an opening spring bracket 64 which is secured between bracing plates 40c and 40d.

FIG. 3 further illustrates the relationship of the operator mechanism, cross shaft and associated linkages. The lower edge of operator frame 47 is linked to side wall 65 by means of angle bracket 54, to prevent vibration and misalignment. Operating linkage 45 is aligned with the central plane of frame 47, so that forces transmitted to or from cross shaft 41 act in the plane of frame 47, and do not tend to move the operator mechanism in a direction parallel to the cross shaft axis. Forces applied to the shaft by the operator are absorbed by the various bracing plates, by way of bearings 55, 56, and 57; and through the bellcrank linkage and interrupters to the upper 37 of the platform.

In link manner, the forces generated by the opening spring 63 are transmitted from shaft 41 to support bracket 64 which is in effect part of the platform structure. In this manner the platform structure, operating mechanism and interrupters form a closed system in which all operating forces are contained. Since none of the operating forces are applied to any other portion of the enclosure, no reactive forces are present which would tend to move the platform with respect to the structure and hence the supporting structure need only be strong enough to bear the dead weight of the platform and the mechanisms which it carries.

The operation of the circuit interrupters and operating mechanism will now be discussed in further detail, making specific reference to the above-enumerated elements of the various figures. While the description will proceed with particular reference to one interrupter, it will be readily understood that in a three-phase electrical system all interrupters operate in the manner, and in synchronism. The function of the elements contained within the housing, of course, is to make and break an electrical circuit. Electrical conductors are coupled to appropriate buses or connectors extending from insulating bushings 29 and 30 so that the bushings and interrupter 32 are interposed in an electrical circuit. In a "closed" mode bellcrank 39 is fully rotated in a clockwise direction, urging the contacts of the interrupter together and compressing bellows 33. Cross shaft 41, including arm 42, are also rotated to their full clockwise position, as seen in FIG. 1, and the linkage 45 of the operating mechanism is fully extended.

Upon reception of an electrical signal indicating a fault or similar condition solenoid 46 is tripped, rotating trip lever 45 in a counterclockwise direction. This allows the lower elements of linkage 66 to move to the left whereupon the linkage collapses and, at the urging of opening spring 63 the cross shaft, including its associated arms, rotates counterclockwise. This pulls pushrod 40 downwardly, rotating bell crank 39 in a counterclockwise direction and pulling apart the contacts within interrupter 32. In the "open" mode it will be understood that spring 63 bears against platform 37 by way of bracket 64; and, by urging the cross shaft in a counterclockwise direction places a downward force on frame 47 of the operator mechanism. This force tends to rotate the operator about shaft 41, which rotation is again restrained by the platform through support bracket 53. It will be seen that all forces generated by, or impressed upon, linkage 66 occur in the plane of frame 47, due to the symmetrical mounting of the linkage. Accordingly, no forces arise which tend to move the frame, and thus the operator mechanism, in a direction transverse to its plane.

In order to reclose the circuit interrupter, the closing spring in the operating mechanism is tripped to cause cam 67 to rotate. The surface of the cam bears against linkage 66 and forces it into its fully extended position as shown in FIG. 1. Trip lever 45 is returned to its original position by means of a small spring 43. As linkage 66 extends arm 42 is pushed upwardly, rotating the cross shaft in a counterclockwise manner and re-compressing opening spring 63. In addition, pushrod 40 is urged upward, causing bellcrank 39 to move in a clockwise sense and reclose the contacts within interrupter 32. Subsquently, means such as electric motor 68 operate to re-charge the closing spring portion of the operator mechanism.

Reclosing of the interrupter, including the clockwise movement of the cross shaft against the pressure of spring 63, causes a downward stress on the operating mechanism which tends to rotate it counterclockwise about the axis of the cross shaft. Since the operator is anchored to the platform by means of racket 53, all forces thus produced are transmitted to the platform Since opening spring 63 is also anchored to the platform, the reactive forces which are generated are contained within the platform structure. Similarly, as the contacts within interrupter 32 close the compressive force is transmitted through the right-hand contact and through support 36 to the deck plate 37a of the platform. No opening or closing forces are transmitted through stabilizer strut 54, and in fact strut 54 is not capable of sustaining any such forces owing to its length and the flexibility of the sheet metal wall 65 which supports it. Strut 54 serves only to keep the operator mechanism from moving in a direction parallel with the cross shaft, principally to dampen vibration and maintain alignment of the system.

In this manner it will be appreciated that the housing structure, specifically the walls and floor thereof, can be formed of relatively light materials since they have only to support the weight of the deck and operating mechanism, and interrupter. Since all of the operating forces and reactive forces of the interrupter operating mechanism are contained within the structure of the platform they are isolated from the outer housing structure, substantially eliminating the need for additional subframes or bracing of heavy structural materials.

As will be evident from the foregoing description, certain aspects of the invention are not limited to the particular details of the examples illustrated, and it is therefore contemplated that other modifications or applications will occur to those skilled in the art. It is accordingly intended that the appended claims shall cover all such modifications and applications as do not depart from the true spirit and scope of the invention.

What is claimed as new and desired to be secured by Letters Patent of the United States is:

1. A housing structure for circuit interrupting apparatus, comprising a generally planar platform disposed horizontally within the housing and dividing the interior of the housing into upper and lower compartments,
   said platform comprising a horizontal, planar plate and a plurality of generally parallel bracing plates depending from the underside thereof;
   a plurality of interrupters disposed upon said plate;
   an interrupter operating mechanism disposed beneath said platform and depending vertically therefrom, said operator mechanism including a generally planar frame and a linkage comprising a plurality of links disposed in the plane of said frame;
   a cross shaft for simultaneously operating said interrupters, said cross shaft being disposed beneath said plate and extending generally perpendicularly to said bracing plates, said cross shaft being rotatably journaled in said operating mechanism, the journal comprising a support point for said mechanism;
   bearing means rotatably locating said cross shaft, said bearing means being secured to at least two of said bracing plates;
   an opening spring having first and second ends, said first end abutting said platform, said second end being coupled to said cross shaft for rotating said cross shaft in a first direction;
   first linkage means coupling said cross shaft to said interrupters for causing said interrupters to open or close as said cross shaft rotates in a first or a second direction;
   second linkage means coupling said cross shaft to said operator mechanism for causing said cross shaft to rotate in response to actuation of said operating mechanism; and
   means rigidily coupling said operating mechanism to said platform for transmitting forces produced by the actuation of said mechanism directly to said platform;

whereby substantially all forces produced by the opening and closing of said interrupters are confined to said platform.

2. A housing structure according to claim 1, wherein said housing structure encloses three interrupters and said platform comprises at least three generally parallel depending bracing plates, said operating mechanism being secured to at least one of said bracing plates.

3. A housing structure according to claim 2, wherein said cross shaft comprises a plurality of arms extending therefrom; one of said arms being coupled to said operating mechanism; another of said arms being coupled to said opening spring; each of said arms being coupled to an interrupter.

4. A housing structure according to claim 2, wherein said cross shaft is rotatably journaled in said operating mechanism and extends through said bracing plates; and bearing means secured to at least three of said bracing plates for rotatably supporting said shaft.

5. A housing structure according to claim 2 wherein there are provided three pairs of bracing plates, each pair being aligned with one of said interrupters; a plurality of arms extending from said cross shaft each generally aligned with each of said interrupters; each of said bearings being disposed on one plate of each of said pairs of plate for rotatably supporting said cross shaft.

6. A housing structure according to claim 5, wherein said operating mechanism is disposed between the plates of one of said pairs of support plates; and bracket means rigidly coupling said mechanism to said pair of plates at a point spaced from said cross shaft.

7. A housing structure according to claim 6, wherein said opening spring is disposed between a pair of support plates other than those between which said operating mechanism is supported.

8. A housing structure according to claim 1, further including vertical side members extending from the ends of said plate, substantially perpendicularly to said bracing plates.

9. A housing structure according to claim 8, further including vertical end members forming end walls of said structure; an elongate, vertical enclosure affixed to the outer surface of each of said vertical end members, said enclosures being open at the lowermost ends thereof, a pair of leg members each slidably located within said vertical enclosures; and means for removably fastening each of said leg members at different points within said vertical enclosures.

* * * * *

UNITED STATES PATENT AND TRADEMARK OFFICE
CERTIFICATE OF CORRECTION

PATENT NO. : 4,445,162
DATED : April 24, 1984
INVENTOR(S) : Sidney R. Hamm and Thomas E. Young It is certified that error appears in the above-identified patent and that said Letters Patent are hereby corrected as shown below:

Column 2 line 7, correct "forgoing object" to read--foregoing objects--.
Column 2 line 31, correct "conjuction" to read--conjunction--.
Column 3 line 9, correct "a" to read--A--.
Column 4 line 33, correct "plateform" to read--platform--.
Column 4 line 60, after "upper" add--plate--.
Column 4 line 61, correct "link" to read--like--.
Column 5 line 57, correct "Subsquently" to read--Subsequently--

Claim 1, column 6 line 66, correct "mechansism" to read --mechanism--.
Claim 5, column 8 line 2, correct "plate" to read--plates--.

Signed and Sealed this

Fourteenth Day of August 1984

[SEAL]

Attest:

GERALD J. MOSSINGHOFF

Attesting Officer

Commissioner of Patents and Trademarks